June 2, 1925.
A. H. YORK
NEST AND ROOST STRUCTURE
Filed July 1, 1924     2 Sheets-Sheet 1
1,539,893.
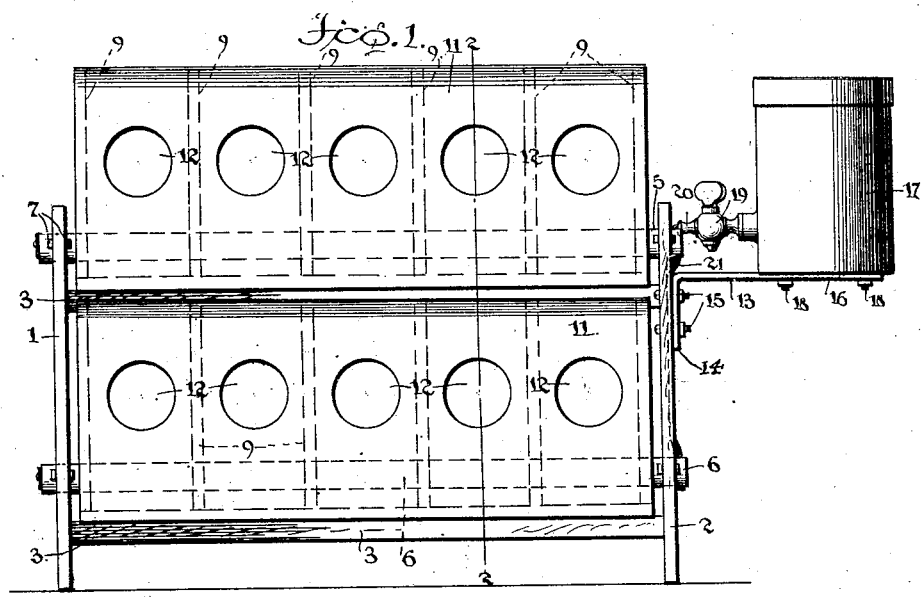
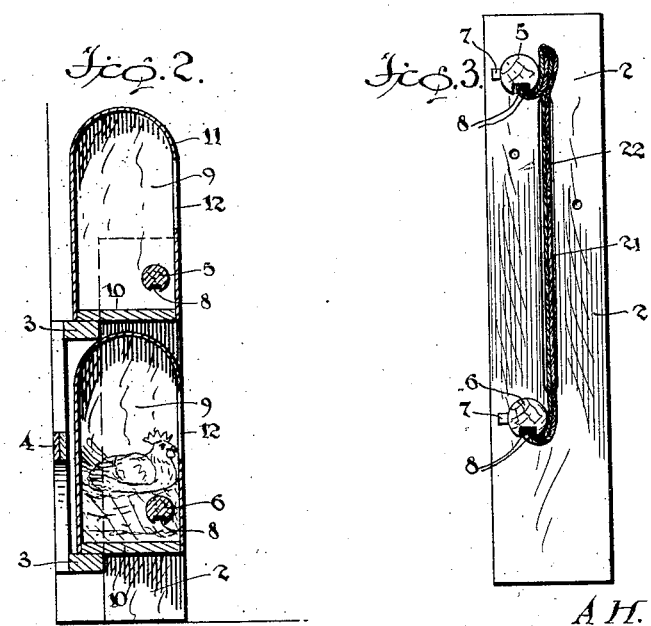
INVENTOR.
A H. York,
BY
ATTORNEY.

June 2, 1925.  1,539,893

A. H. YORK

NEST AND ROOST STRUCTURE

Filed July 1, 1924  2 Sheets-Sheet 2

INVENTOR.
A. H. York,
BY
Geo. P. Kimmel
ATTORNEY.

Patented June 2, 1925.

1,539,893

UNITED STATES PATENT OFFICE.

ALBERT H. YORK, OF AMERY, WISCONSIN.

NEST AND ROOST STRUCTURE.

Application filed July 1, 1924. Serial No. 723,552.

*To all whom it may concern:*

Be it known that I, ALBERT H. YORK, a citizen of the United States, residing at Amery, in the county of Polk and State of Wisconsin, have invented certain new and useful Improvements in Nest and Roost Structures, of which the following is a specification.

This invention relates to a nest and roost structure for use of domestic fowls and has for its primary object the provision, in a manner as hereinafter set forth, of a nest and roost of such structure that each of the nests and each of the perches of the roosts will be continually supplied with a disinfectant which will not only keep the nest and perches of the roost sanitary and clean of vermin, but will be communicated to the fowl using the device.

A further object of this invention is the provision, in a manner as hereinafter set forth, of a nest and roost structure having means for supplying under control a disinfectant fluid to each of the nests and to each of the perches of the roost.

A still further object of the invention is the provision, in a manner as hereinafter set forth, of an improved nest structure in which the nests are arranged in series and each series is connected by a disinfectant conveying means which extends therethrough below the bedding of the nest and which further serves as a pivotal support for the series of nests whereby the same may be inverted for cleaning.

Another and still further object of the invention is the provision, in a manner as hereinafter set forth, of an improved roost for domestic fowls, the connected perches of which are supported upon a low gradually sloping frame, which frame has means for conveying to each of the perches a disinfectant which is distributed throughout their lengths upon the under side.

A final object of this invention is the provision, in a manner as hereinafter set forth, of a hen nest structure and roost of simple construction, easily kept clean and sanitary, of unique design, and inexpensive to manufacture and install.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:

Figure 1 is a front elevation of the nest structure embodying this invention showing the disinfectant container and supply means supported from one side thereof.

Figure 2 is a vertical transverse sectional view upon the line 2—2 of Figure 1.

Figure 3 is an end elevation of the structure, the container and bracket thereof being removed.

Figure 4:
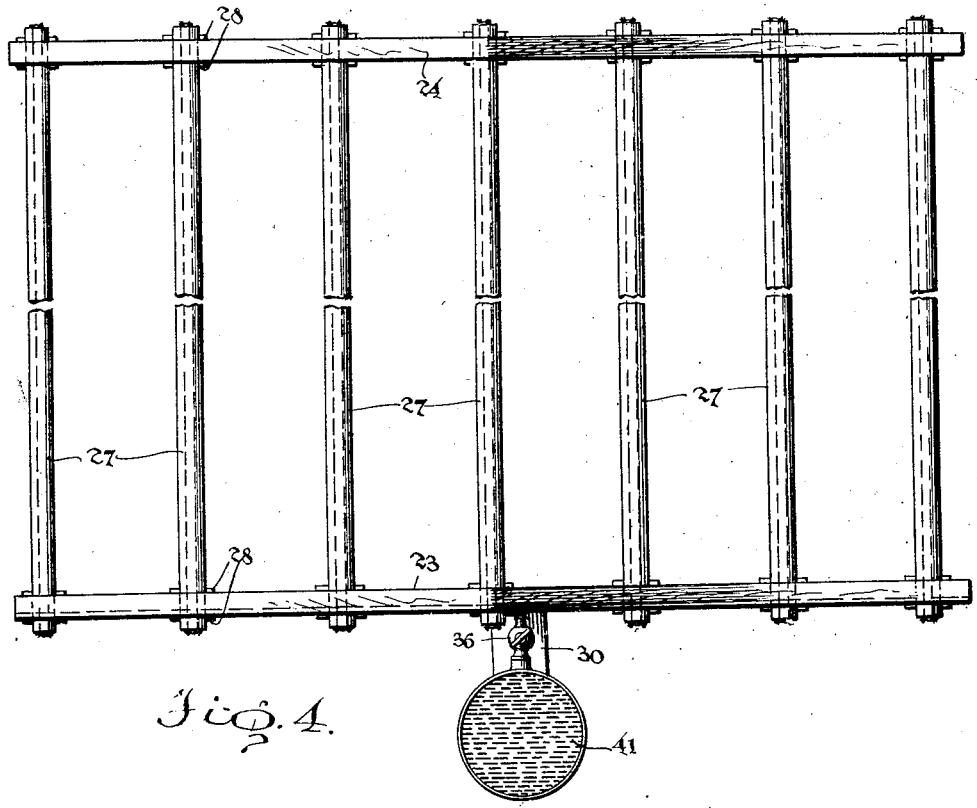
Figure 4 is a top plan view of the roost embodying this invention showing the disinfectant container supported at one side thereof.

Referring now to the drawings in detail wherein like numerals of reference indicate corresponding parts throughout the several views of the drawings, a pair of spaced vertical standards is indicated respectively by the numerals 1 and 2, these standards being of substantial width and length as shown in Figure 3. These members 1 and 2 are connected across their edges by the horizontal members 3, which members are in turn connected by the brace rod 4.

Connecting the opposed broad faces of the members 1 and 2 adjacent their front edges is a pair of rounds 5 and 6, the ends of each of which extend through the standards 1 and 2 and are secured in position by means of the transverse pins 7, which as shown in Figure 1 are spaced and positioned one on each side of the standard through which the end of the round extends. These rounds are so secured in the standards that they will be revoluble and the purpose of this will become apparent as the description of the structure proceeds.

Each of the rounds has formed therein a longitudinally extending gutter or groove 8, this groove extending throughout the entire length of the round.

Eccentrically mounted and equidistantly spaced upon each of the rounds 5 and 6, is a series of partition members 9, which are as shown, of substantial length and relatively narrow with respect to the length, and each has its upper end of semi-circular formation as clearly shown in Figure 2.

Extending across and connecting the lower edges of each of the partitions 9 is a floor plank 10, the front edge of this floor plank being substantially in alignment with the front edge of the end standards 1 and 2, and the rear edge extends beyond the end standards a sufficient distance to rest upon the tops of the horizontal connecting members 3. These floor planks are of the same width as the partitions 9.

Formed over the partitions 9 and extending from one end of the series to the other and further covering all of them and the spaces therebetween is a sheet of material 11, preferably metal, which when in position is, in cross section, of substantially inverted U-shaped formation, as shown in Figure 2. This covering sheet of material 11 thus forms with the partitions 9 and the floor boards 10 of the upper and lower series, a longitudinally extending series of compartments, and each series of compartments, as shown in Figure 2, is arranged in alignment one above the other and the rounds 5 and 6, which extend through the partitions 9 and support each of the series, are positioned one directly above the other as shown.

The material 11 which forms the outer wall for the compartment formed between the partitions 9, has through one side a horizontally extending series of apertures 12, one for each of the compartments, and each aperture is so positioned in the material 11 that it will be arranged a substantial distance above the floor 10 of the compartment.

Secured to the outer face of the standard 2 is an angle bracket indicated as a whole by the numeral 13, and the short arm 14 of this bracket is secured by means of bolts 15 to the standard 2 and the long arm 16 is extended outwardly therefrom at right angles thereto and supports upon its outer end a container 17, which container has the bottom thereof bolted to the arm 16 by means of the bolts 18 as shown.

A drain cock 19 is secured in the wall of the container 17, and the nozzle 20 of this cock 19 has leading therefrom wicks 21, certain of which wicks extend from the nozzle 20 down and along the groove 8 of the upper round 5, throughout its length, and other wicks extend downwardly in a groove 22 formed in the outer face of the standard 2 to the lower round 6, where they enter the grooves 8 therein and extend throughout the length of this lower round. Antiseptic is placed in the container 17 and the same will run through the drain cock 19 and from the nozzle 20 and be absorbed by the wicks 21 and carried thereby throughout the length of the rounds 5 and 6 through the nest compartments.

It will thus be seen that when nesting material is placed in the compartments, it will surround the rounds 5 and 6 and the antiseptic fluid carried by the wicks 21 along the groove 8 in the rounds will be communicated to the nests and also to the fowls setting thereon and thus keep the nests and fowls free from vermin and in a sanitary condition.

It has been stated above and it is clear upon reference to Figure 2, that the upper and lower series of nests are eccentrically mounted upon the rounds 5 and 6 and that the rear portion thereof rests upon the top of the horizontal connecting members 3. These rounds are loosely mounted to revolve in the standards 1 and 2 and therefore when it is desired to clean out the compartments, the upper or the lower series may be tipped over upon the supporting rounds until the aperture 12 of the compartment is facing downwardly whereupon the nest material may be easily and expeditiously removed from the compartments for replacement by fresh material.

The roost structure comprises a pair of substantially elongated edge supported base members 23 and 24 respectively, the lower edge of each member being unbroken throughout and having therein a pair of pins or feet 25, one near each end thereof to support the lower edge of the member from the dropping board indicated at 26, upon which the roost is to be positioned. The top edge of each of the members 23 and 24 is inclined from the central portion of the member downwardly toward each end thereof as shown clearly in Figure 5, the top edges of the members 23 and 24 being sloped alike and arranged in the same plane.

Figure 5:
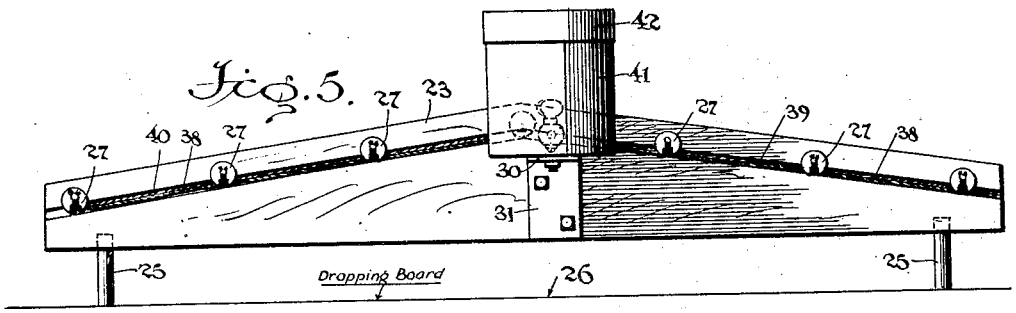
Figure 5 is a side elevation thereof.
Figure 6:
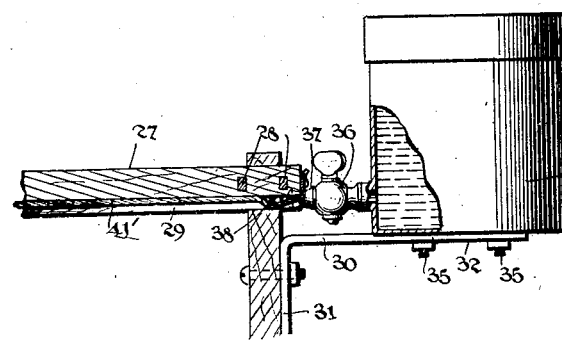
Figure 6 is an enlarged detail sectional view showing the method by which the antiseptic is conveyed from the container to the perches.

Connecting the members 23 and 24 is a plurality of perches 27, the ends of which are extended through the members 23 and 24 as shown, and as shown in Figure 5, the ends which extend through the members 23 and 24 are each spaced the same distance below the upper or sloping edge of the member, thus the perches are arranged in an inclined position.

Each of the perches 27 has extended transversely through each end a pair of pins 28, these pins being spaced and positioned one on either side of the member 24 or 25 through which the end of the perch extends. Each of these perches further has a groove formed therein and extending throughout the length of the perch, and when the perches are in position, these grooves indicated at 29 extend along the under side of the perch. Secured upon the outer face of the side member 23 is a right angled bracket indicated as a whole at 30, this bracket having one short arm 31 which is secured to the member 23 and a long arm 32 which extends outwardly at right angles to the face of the member 23 and which supports a disinfectant container 34, the bottom of this container being secured to the arm 32 by means of the bolts 35. Secured upon the side of the container 34 is a drain cock 36 having a nozzle 37 from which there is extended a wick 38, one portion of which is carried in a groove 39 formed just below the projected ends of the perches 27, to the outer end of the member 23 at one side and the other portion of the wick being extended in a similar groove 40 formed in the outer face of the member 23 just below the extended ends of the perches 27, to the other outer end of the member 23. Wicks 41 are positioned within the grooves 29 of each of the perches 27 and extend outwardly beyond the ends thereof and are secured over the wicks 38. An antiseptic fluid indicated at 41 is placed within the container 34 and the drain cock 36 is opened to allow the fluid to flow therethrough and be absorbed by the wicks 38, which carry the fluid along the grooves 39 and 40 and transfer the same to the wicks 41' located in the grooves 29 of the perches to carry the fluid throughout the length of each of the perches. A top 42 is provided for each of the containers so that access may be had thereto.

The flow of antiseptic to the perches 27 and into the nest compartments may be controlled by varying the opening in the drain cock to increase or decrease the amount of disinfectant fluid allowed to come into contact with the wicks, thus the perches and the nests may always be kept well supplied with an antiseptic to keep the same clean.

From the foregoing description it may be seen that a very novel and improved nest and perch structure is provided with means for keeping the same clean and free from vermin and which structure is not complicated or expensive to manufacture.

Having thus described my invention what I claim is:

1. A structure for the purpose set forth, spaced supporting members, one thereof having a groove in its outer face, a plurality of longitudinally grooved supporting members connecting said spaced members, absorbent elements within the grooves of said members, and means carried upon one of said spaced members from which said absorbent elements may draw disinfectant to convey the same beneath the birds.

2. A structure for the purpose set forth, spaced supporting members, one thereof having a groove in its outer face, a plurality of longitudinally grooved supporting members connecting said spaced members, a disinfectant containing reservoir supported from one of said spaced members, valve control outlet means therefor, and absorbent wicks leading from said outlet means and adapted to convey disinfectant throughout the length of the grooves of each of said members beneath the birds.

3. In a nest structure, upright end supporting members, an elongated grooved member supported at its ends between said members, means to provide a series of covered nest compartments supported and traversed by said member, absorbent means positioned in the groove of said member to convey a disinfectant therealong through said nest compartments, a disinfectant reservoir supported by one of said upright members, and absorbent wick elements adapted to convey a disinfectant from said reservoir along the groove in said member to each of the nest compartments.

4. In a nest structure of the character set forth, supporting members, a plurality of vertically spaced rounds extending therebetween, connected thereto adjacent the longitudinal edges of one side thereof, brace members connecting the other longitudinal edges of said supporting members, and means to provide a longitudinally extending unitary series of nesting compartments eccentrically mounted upon each round and supported at the rear upon one of said brace members.

5. In a nest structure of the character set forth, supporting members, a plurality of vertically spaced rounds extending therebetween and connected thereto adjacent the longitudinal edges at one side thereof, brace members connecting the other longitudinal edges of said supporting members, and means to provide a longitudinally extending unitary series of nesting compartments eccentrically mounted upon each round and supported at the rear upon one of said brace members, said rounds having their ends mounted for revolution in said supporting members to allow for the forwardly swinging of said compartments.

6. In a bird nest structure of the character set forth, vertically arranged spaced supporting members, one having a longitudinally extending groove in the outer face thereof, a plurality of vertically spaced grooved rounds extending therebetween and adjacent the longitudinal edges at one side thereof, a longitudinally extending series of nesting compartments supported by and traversed by said rounds, means to provide a disinfectant carrying receptacle, and wick means adapted to carry a disinfectant from said receptacle along the groove of said member and that of each round through the nesting compartments.

7. In a nest structure of the character set forth, spaced end supporting members, a horizontal supporting member connected at its ends to said spaced members, a series of vertically positioned eccentrically mounted partition elements upon said horizontal member, an elongated member connecting the lower ends of said elements and constituting a floor, and an apertured sheet of material formed over and connecting the ends of said elements and connected to the edge of said floor member to enclose the spaces therebetween to provide nesting compartments, one of each of the apertures in said sheet constituting an entrance for a compartment.

8. In a nest structure of the character set forth, spaced supporting members, a horizontal supporting member connecting said spaced members, a series of vertically positioned eccentrically mounted partition elements upon said horizontal member, an elongated member connecting the lower ends of said elements and constituting a floor, and an apertured sheet of material formed over and connecting the edges of said elements to enclose the spaces therebetween to provide nesting compartments, one of each of the apertures in said sheet constituting an entrance for a compartment, said horizontal member being mounted to revolve in said spaced members to permit the partial inversion of said compartments for the cleaning of the same.

9. In a nest structure of the character set forth, spaced upright end supporting members, a horizontal supporting round having a groove therein extending throughout the length thereof and connected at its ends to said supporting members, a series of vertically positioned eccentrically mounted partition elements upon said horizontal member, an elongated element connecting the lower ends of said elements and constituting a floor, an apertured sheet of material formed over and connecting the edges of said elements to enclose the spaces therebetween to provide nesting compartments, one of each of the apertures in said sheet constituting an entrance to a compartment, a wick element in the groove of said round, and means for supplying disinfectant to said wick for the distribution of the same through the nest compartments.

In testimony whereof I affix my signature hereto.

ALBERT H. YORK.